(12) United States Patent
Miyagi et al.

(10) Patent No.: US 6,190,797 B1
(45) Date of Patent: Feb. 20, 2001

(54) METHOD OF MANUFACTURING AN ELECTRODE PLATE ASSEMBLY FOR LEAD ACCUMULATOR AND DEVICE THEREFOR

(75) Inventors: Rikio Miyagi, Kosai; Masao Ito, Hiratsuka; Hiroshi Hori; Shinya Ajisaka, both of Toyohashi, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/119,128

(22) Filed: Jul. 20, 1998

(30) Foreign Application Priority Data

Sep. 5, 1997 (JP) .................................................. 9-240548

(51) Int. Cl.[7] .......................... H01M 4/08; H01M 10/14; H01M 2/22; H01M 2/26
(52) U.S. Cl. ..................... 429/160; 429/158; 429/233; 29/204; 29/623.1
(58) Field of Search .................................. 429/233, 160, 429/157, 158, 123, 161; 29/264, 623.1

(56) References Cited

U.S. PATENT DOCUMENTS

| | | | | |
|---|---|---|---|---|
| 3,816,898 | * | 6/1974 | Odman | 29/204 |
| 4,742,611 | * | 5/1988 | Meadows | 29/623.1 |
| 5,146,974 | * | 9/1992 | Mayer | 164/309 |
| 5,202,198 | * | 4/1993 | Mix | 429/160 |

* cited by examiner

Primary Examiner—Maria Nuzzolillo
Assistant Examiner—Mark Ruthkosky
(74) Attorney, Agent, or Firm—Jordan and Hamburg LLP

(57) ABSTRACT

Entry of molten lead into the space between the electrode plates from the gap between welding jig 12 and electrode plate lead 6 is prevented by a construction of pouring nozzle 17 in which the flow speed and temperature of the molten lead when molten lead is poured into the recess of the welding jig 12 are lowered. Also, admixture of oxide and/or scum is eliminated by discharging the molten lead from the bottom of reservoir 36. Furthermore, reliable joining of strap 2, electrode plate leads 6 and pillar electrode 4 is achieved by prioritising melting of electrode plate leads 6, pillar electrode 4 and the vicinity thereof by plasma welding.

31 Claims, 14 Drawing Sheets

1

2

3

4

5

7B

9B 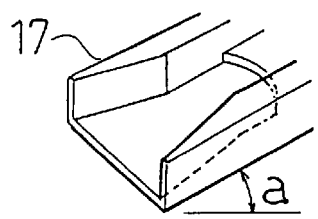
9C 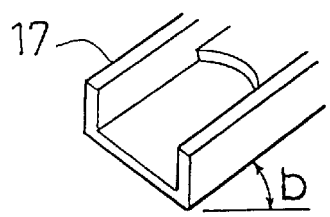
9D 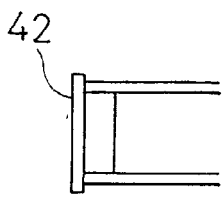
9E 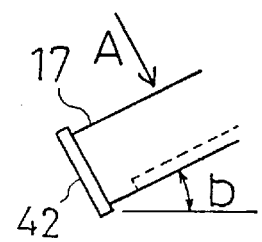
9F 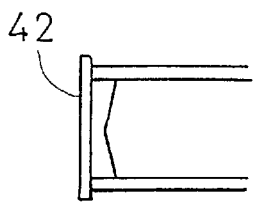
9G 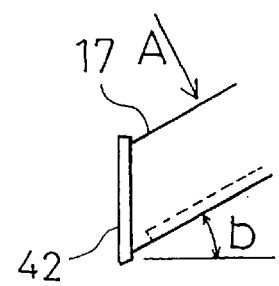

11B

11C

15B

15C

15D

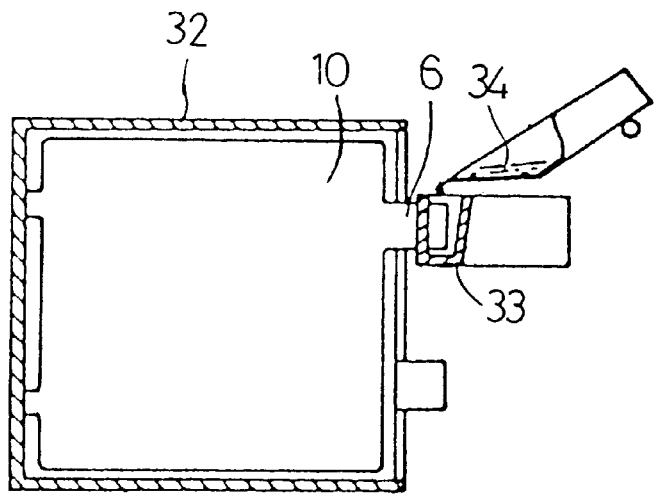
Prior Art
Fig. 16A
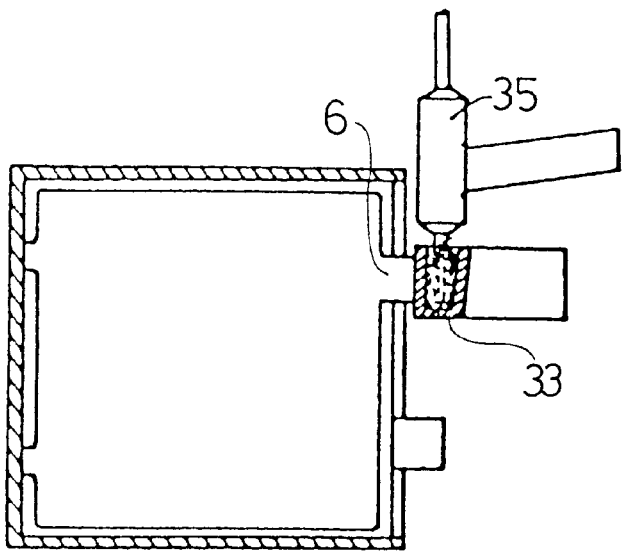
16B

METHOD OF MANUFACTURING AN ELECTRODE PLATE ASSEMBLY FOR LEAD ACCUMULATOR AND DEVICE THEREFOR

BACKGROUND OF THE INVENTION

1. Field of the Invention

The present invention relates to a method of manufacturing an electrode plate assembly for a lead accumulator and a device therefor by which the electrode plate assembly of a lead accumulator is manufactured by forming a strap connecting electrode plates on an electrode plate group constituted by stacking a plurality of electrode plates, as well as by joining pillar electrodes on the electrode plate group.

2. Description of the Related Art

As shown in FIG. 14, an electrode plate assembly 1 of a lead accumulator comprises an electrode plate group 10 which is constituted by alternately stacking a plurality of positive and negative electrode plates 3 with interposition of separators 5. Electrode plate leads 6 are formed in projecting manner on each row of the electrode plates 3. The electrode plate assembly 1 is manufactured by effecting connection between respective positive and negative electrode plates 3 by forming respective straps 2 on the positive electrode plate side and negative electrode side on the electrode plate leads 6 and welding the straps 2 and the electrode plate leads 6. Also, pillar electrodes 4 are joined to respective straps 2.

Hereinbelow, for definiteness of the description, the condition in which a plurality of electrode plates 3 are stacked will be referred to as electrode plate group 10, and the condition in which straps 2 and pillar electrodes 4 are formed on this electrode plate group 10 will be referred to as electrode plate assembly 1.

As shown in FIGS. 15A–15D, a conventional method for manufacturing an electrode plate assembly 1 by forming straps 2 and pillar electrodes 4 on electrode plate group 10 is implemented by a manual or automatic welding operation using a welding jig 12 comprising a mating element 7 and a comb element 8. As shown in FIG. 15A, screening between the plate faces of electrode plates 3 and the electrode plate leads 6 is effected by mating the mating element 7 and the comb element 8 with respect to electrode plate leads 6 by inserting the comb teeth of comb element 8 between the row arrangement of electrode plate leads 6, and a pillar electrode 4 is mounted as shown in FIG. 15B in a prescribed position of a recess formed in the external shape of strap 2 on the upper surface of mating element 7 and comb element 8. Next, as shown in FIG. 15C, electrode plate leads 6 projecting into welding jig 12 are heated and melted by burner 9 and a solid lead stock 11 is simultaneously melted by burner 9, causing the lead to flow onto the electrode plate leads 6, thereby filling the recess of the welding jig 12 with melted lead. The shape of straps 2 is thereby formed, and the base of pillar electrode 4 is melted, joining it to strap 2. After the straps 2 have been formed, the welding jig 12 is removed as shown in FIG. 15D. By performing this operation for electrode plate leads 6 of the positive and negative electrodes, an electrode plate assembly 1 as shown in FIG. 14 is formed.

When this welding process is carried out by a manual operation, the worker performs the above operation by holding burner 9 and lead stock 11, and placing welding jig 12 on the electrode plate lead 6 section of electrode plate group 10 and arranging pillar electrode 4 in the prescribed position on welding jig 12.

In contrast, in the case of automatic welding, welding jig 12 and pillar electrode 4 are set in position on electrode plate group 10 fed to the prescribed processing position, and strap 2, joining electrode plate leads 6 and pillar electrode 4, is formed by melting electrode plate leads 6 and a prescribed quantity of lead stock 11 supplied to the recess of welding jig 12.

When the above method of manufacturing an electrode plate group is carried out by a manual operation, differences in the finish are produced by the degree of skill of the worker and a good finished condition has to depend on the "feeling" or "knack" of the worker, so that constant quality is difficult to achieve. Further problems are a working environment in which gas or vapour is generated and poor operating efficiency. In the case where automatic welding is employed, "melting off" (contraction of the lead width) may occur due to local heating of the electrode plate leads 6 caused by misalignment of the feed position of the lead stock 11, and different amounts of lead stock 11 must be prepared for each type of product. Also, although in the manual operation an oxide coating on the surface of the lead can be removed by playing on it the reductive flame produced by burner 9, in the case of automatic welding, the location where the flame plays is automatically controlled, so the range where the oxide coating can be removed is restricted. This leads to the problem of production of bad welds due to unremoved oxide coating.

Accordingly, a method is being developed whereby formation of straps 2 is performed using pre-melted lead rather than solid lead stock 11. When supplying the molten lead, with electrode plate leads 6 of electrode plate group 10 on top, as in the method of manufacture described above, the molten lead penetrates to the electrode plates 3 through gaps between the comb tooth portion of welding jig 12 and electrode plate leads 6. A method has therefore been disclosed in Early Japanese Patent Publication No. 53-36645 in which straps 2 are formed by pouring in molten lead into the mould in which an electrode plate group 10 is set at the location of the electrode plate leads 6, with the electrode plate leads 6 directed laterally in a laterally tipped-over condition.

FIGS. 16A and 16B illustrate this method of manufacture. As shown in FIG. 16A, a strap metal mould 33 is attached to electrode plate leads 6 of an electrode plate group 10 which is tipped over sideways and fixed within a feed box 32, and molten lead 34 is poured into strap metal mould 33. As shown in FIG. 16B, after the lead has been poured in and solidified, the contacts with the solidified lead and the electrode plate leads 6 are re-melted using a plasma welding torch 35, thereby welding these two together.

However, with the method of manufacture using molten lead described above, electrode plate group 10 has to be in a condition tipped over on its side, so it is necessary to change the direction of this sideways tipping over of electrode plate group 10 when strap 2 is formed on the positive electrode side and when strap 2 is formed on the negative electrode side. Thus, in each of the steps of manufacturing a lead accumulator, a step is also required of tipping over and erecting electrode plate group 10. This lowers working efficiency and gives rise to a risk of producing changes in the stacked condition of electrode plates 3. As the size of the lead accumulator increases, the weight of electrode plate group 10 increases and the operation of tipping over and erecting this electrode plate group 10 is not easy. A further problem is that, when the molten lead is poured in, lead oxides and/or scum produced at the surface of the molten lead also get poured in with it, so that straps 2 are formed containing lead oxide and/or scum.

SUMMARY OF THE INVENTION

An object of the present invention is to provide a method of manufacturing a lead accumulator electrode plate assembly and a device therefor wherein a strap is formed by pouring molten lead with the electrode plate leads of an electrode plate group in an erect condition.

In order to achieve this object, the manufacturing method of a lead accumulator electrode plate assembly according to the present invention, wherein an electrode plate group is formed by alternately stacking a plurality of positive and negative electrode plates with interposition of separators, and a strap is formed by linking and joining electrode plate leads and by joining pillar electrodes respectively to a positive electrode row and negative electrode row of electrode plate leads formed projecting from the electrode plates, comprises the steps of: arranging said electrode plate group in a condition with the electrode plate leads directed upwards; in respect of a positive electrode row and negative electrode row respectively of said electrode plate leads, attaching a welding jig which is formed with a recess corresponding to an external shape of said strap to the electrode plate group with said electrode plate lead rows accommodated in the recess by insertion of comb teeth formed at a bottom face of the recess of this welding jig in gaps between the electrode plate leads; placing said pillar electrodes at a prescribed position in the recess; and pouring molten lead into said recess at a temperature and pressure such that molten lead does not enter from gaps between the electrode plate lead rows and the comb teeth of the welding jig.

With the manufacturing method described above, with the electrode plate leads of the electrode plate group arranged directed upwards, the molten lead is poured into the recess of the welding jig, which is attached to the electrode plate lead portion. Since there are large differences in thickness between the electrode plate leads, gaps are produced between the electrode plate leads and the comb teeth of the welding jig that is inserted between the electrode plate leads which are arranged in a row. Thus if high-temperature molten lead is poured in vigorously, the molten lead penetrates from the aforesaid gap portions into the space between the electrode plates, causing short circuiting between the electrode plates. Accordingly, in the present method of manufacture, the temperature and pouring pressure of the molten lead are restricted so that the molten lead is poured in such a way that it rapidly solidifies after it has been poured in. Consequently, even though the molten lead is poured in in a condition with the electrode plate group arranged with the electrode plate leads directed upwards, the molten lead solidifies before it can penetrate between the electrode plates. Consequently, strap formation by pouring in of molten lead can be performed without requiring performance of a step of pouring in the molten lead in a condition with the electrode plate group tipped over to its side, which takes a long time.

Also, the manufacturing method of a lead accumulator electrode plate assembly according to the present invention, wherein an electrode plate group is formed by alternately stacking a plurality of positive and negative electrode plates with interposition of separators, and a strap is formed by linking and joining electrode plate leads and by joining pillar electrodes respectively to a positive electrode row and negative electrode row of electrode plate leads formed projecting from the electrode plates, comprises the steps of: arranging said electrode plate group in a condition with the electrode plate leads directed upwards; in respect of a positive electrode row and negative electrode row respectively of said electrode plate leads, attaching a welding jig which is formed with a recess corresponding to an external shape of said strap to the electrode plate group with said electrode plate lead rows accommodated in the recess by insertion of comb teeth formed at a bottom face of the recess of this welding jig in gaps between the electrode plate leads; placing said pillar electrodes at a prescribed position in the recess; and pouring a prescribed quantity of molten lead from a melting furnace into the recess in the welding jig such that the molten lead spreads out in the direction of the electrode plate lead rows to promote radiation of heat and in a condition in which the pouring pressure is suppressed; fixing integrally temporarily the electrode plate leads and said pillar electrode by solidification of the poured molten lead; joining the solidified lead, electrode plate leads, and base of the pillar electrode by melting with heat by means for heating, along the shapes of the electrode plate leads and base of the pillar electrode; and removing said welding jig, thereby integrally forming a strap on the positive and negative electrode lead rows.

With the method of manufacture described above, the molten lead is poured into the recess of the attached welding jig with the electrode plate leads of the electrode plate group in an erect condition, directed upwards. The attachment of the welding jig effects screening between the electrode plate leads and electrode plates, because the comb teeth that are formed on the bottom face of the recess of the welding jig are inserted between the electrode plate leads. However, due to differences in thickness of the electrode plate leads, gaps are produced between the comb teeth and the electrode plate leads and if molten lead is simply poured in in this condition, the molten lead penetrates from the gaps into the spaces between the electrode plates, giving rise to a considerable risk of short circuit faults.

Accordingly, by arranging for the molten lead to be poured into the recess with the pouring pressure and temperature of the molten lead lowered, this molten lead with low pouring pressure and, in addition, lowered temperature, solidifies before it can penetrate between the electrode plates, with the result that penetration is prevented. After the molten lead that is filled into the recess, joining the electrode plate leads and pillar electrode, has solidified, the solidified lead and electrode plate leads and the base of the pillar electrode are melted by the means for heating so that they are integrally joined, thereby forming the strap.

In the pouring in of the molten lead in the above method of manufacture, by holding the amount of discharge of molten lead from a pouring aperture fixed, while moving the pouring aperture in the direction of the electrode plate lead row and controlling its speed of movement in accordance with the pouring location, filling with molten lead can be performed with a filling amount corresponding to the volume at the pouring location, thereby enabling the thickness of the formed strap to be kept constant.

In the step of pouring in the molten lead, the pouring aperture of the molten lead is moved in the direction of the electrode plate lead row, while the amount of discharge from the melting furnace is controlled in accordance with the location to which the pouring aperture has moved. Filling with molten lead can be thereby performed with a filling amount corresponding to the volume of the location where pouring in is effected, and the thickness of the strap that is formed can be kept constant.

Furthermore, by effecting pouring in by discharging the molten lead within the melting furnace from below the melting furnace, admixture of oxides and/or scum produced at the surface of the molten lead in the melting furnace is prevented, making it possible to prevent a lowering in the quality of the strap that is formed.

Furthermore, by arranging for the movement of the means for heating to be controlled such as to follow a prescribed tracing path corresponding to the shape of the electrode plate leads at the base of the pillar electrode, melting of the electrode plate leads and the base of the pillar electrode and its vicinity is prioritised, enabling melt-joining of the solidified lead and electrode plate leads and pillar electrode constituting the strap to be achieved, with the result that joining is obtained with no production of joint defects.

A device for manufacturing a lead accumulator electrode plate assembly according to the present invention, wherein an electrode plate group is formed by alternately stacking a plurality of positive and negative electrode plates with interposition of separators, and a strap is formed by linking and joining electrode plate leads and by joining pillar electrodes respectively to a positive electrode row and negative electrode row of electrode plate leads formed projecting from the electrode plates, comprises, for the positive electrode row and negative electrode row respectively of the electrode plate leads of the electrode plate group arranged in a condition with said electrode plate leads directed upwards, means for attaching and removing a welding jig whereby a welding jig formed with a recess corresponding to the external shape of said strap is attached to the electrode plate group with said electrode plate lead row accommodated in the recess by insertion of comb teeth formed on the bottom face of the recess of this welding jig in gaps between the electrode plate leads, the pillar electrode is arranged in a prescribed position in the recess, and said welding jig is removed from the electrode plate group after formation of said strap on the electrode plate group; means for pouring molten lead whereby a prescribed quantity of molten lead is poured from a melting furnace into the recess in the welding jig such that the molten lead spreads out in the direction of the electrode plate lead rows to promote radiation of heat and in a condition in which the pouring pressure is suppressed; and means for heating which heats the molten lead that has been solidified, temporarily unitarily fixing the electrode plate leads and said pillar electrode, along the shape of the electrode plate leads and base of the pillar electrode, thereby melting and joining the solidified lead, electrode plate leads, and base of the pillar electrode.

With the above construction, the electrode plate group is arranged in an upright condition with the electrode plate leads of the electrode plate group directed upwards, the welding jig is attached by the means for attaching and detaching the welding jig, and molten lead is poured in from the means for pouring in molten lead into the recess of the attached welding jig. The attachment of the welding jig produces screening between the electrode plate leads and electrode plates by insertion of the comb teeth that are formed on the recess bottom face of the welding jig between the electrode plate leads. However, owing to differences in the thickness of the electrode plate leads, gaps are produced between the comb teeth and the electrode plate leads. If in this condition molten lead is simply poured in, the molten lead penetrates from the gaps into the spaces between the electrode plates, giving rise to a considerable risk of production of short circuit defects. However, since pouring in of the molten lead into the recess is performed with the pouring temperature and pressure of the molten lead lowered, this molten lead, with its low pouring pressure combined with lowered temperature, solidifies before it can penetrate from the gaps into the spaces between the electrode plates. Penetration is thereby prevented. After the molten lead that is filled into the recess and that has joined the electrode plate leads and pillar electrode has solidified, the solidified lead and the electrode plate leads and pillar electrode base are melted by the means for heating, so that melt-joining is effected. In this way, a strap is formed by integral joining, without formation of an oxide interface.

By forming the means for pouring molten lead in the above construction such that the molten lead is discharged from a discharge aperture formed below the melting furnace, it can be ensured that oxides and/or scum produced at the surface of the molten lead in the melting furnace are not discharged. There is therefore no admixture of impurities with the molten lead that is formed as the strap, so a strap of excellent quality can be formed.

The pouring nozzle of the means for pouring the molten lead whereby the molten lead is poured into the recess is formed in the shape of flat-bottomed spout. The tip of this pouring nozzle is closed off by a screening plate in the downstream direction of the molten lead, and an aperture whose longitudinal direction is the direction of the electrode plate lead row is formed as a molten lead pouring aperture in the bottom face adjacent the screening plate. Thus, the molten lead that is discharged from the melting furnace flows down through the pouring nozzle of flat-bottomed spout shape, is dispersed by collision with the screening plate at the pouring aperture, and is poured from the slot-shaped aperture in dispersed manner. The temperature and flow speed of the molten lead when poured into the recess from the pouring aperture are thereby lowered, and the molten lead from the gaps between the comb teeth portions of the welding jig and the electrode plate leads solidifies before it can penetrate into the spaces between the electrode plates. Accordingly, penetration of molten lead between the electrode plates is prevented and, even in a condition in which the electrode plate group is upright, formation of a strap by pouring in of molten lead can be performed in a stable manner.

Furthermore, by making the molten lead pouring aperture an aperture whose direction of elongation is the direction of formation of the electrode plate lead row at the bottom face adjacent the screening plate, being formed such that its aperture width increases towards both ends in the longitudinal direction, the molten lead that flows down from the molten lead pouring aperture is dispersed in the form of a fan when it is discharged. In this way, the temperature and pressure of the molten lead that is poured into the recess can be effectively lowered.

Furthermore, by adopting a construction wherein the amount of molten lead that is filled into the recess from the means for pouring molten lead can be adjusted corresponding to the position of pouring into the recess, the molten lead is poured into the recess with a filling amount corresponding to the different filling amount at each different filling location, so a strap of uniform thickness can be formed.

Furthermore, by constituting the means for heating as a welding device in which welding is effected whilst blowing on a mixed gas containing reducing gas, removal of oxide film on the surface of the electrode plate leads and pillar electrode can be effectively performed by the reducing gas. Also, by using plasma welding as the welding device, local concentrated heating can be achieved, so heating and melting can be performed preferentially on the electrode plate leads and base of the pillar electrode and its vicinity, without heating and melting in unwanted locations.

Furthermore, by adopting a construction such that the output of the welding device and the speed of movement of the welding torch can be controlled such that the melting depth produced by the means for heating at locations including the solidified lead and electrode plate leads, and base of the pillar electrode is a fixed depth that does not reach the bottom face of the recess of the welding jig, melting and joining of the electrode plate leads, pillar electrode base and solidified lead can be achieved in a reliable manner and molten excursions of the electrode plate leads towards the electrode plates can be prevented.

Furthermore, by controlling the means for heating such that the welding torch is moved along a prescribed melting path that traces the shapes of the electrode plate leads and the base of the pillar electrode, melting can be preferentially performed on the electrode plate leads, base of the pillar electrode and its vicinity, thereby enabling reliable melt-joining of the electrode plate leads and pillar electrode to the molten lead that forms the strap to be achieved.

BRIEF DESCRIPTION OF THE DRAWINGS

FIG. 7A is a perspective view showing a pouring condition of molten lead and FIG. 7B is a plan view showing a tip of a pouring nozzle;

FIGS. 9A–9G are explanatory views showing examples of tests for determining an optimum construction of the pouring nozzle;

FIG. 11B is a view showing the condition during the process of heating and melting, and FIG. 11C is a partial cross-sectional view showing the condition after completion of joining;

FIG. 16 is a cross-sectional view showing the procedure for forming a strap by pouring of molten lead according to the prior art.

DESCRIPTION OF THE PREFERRED EMBODIMENTS

Figure 1:
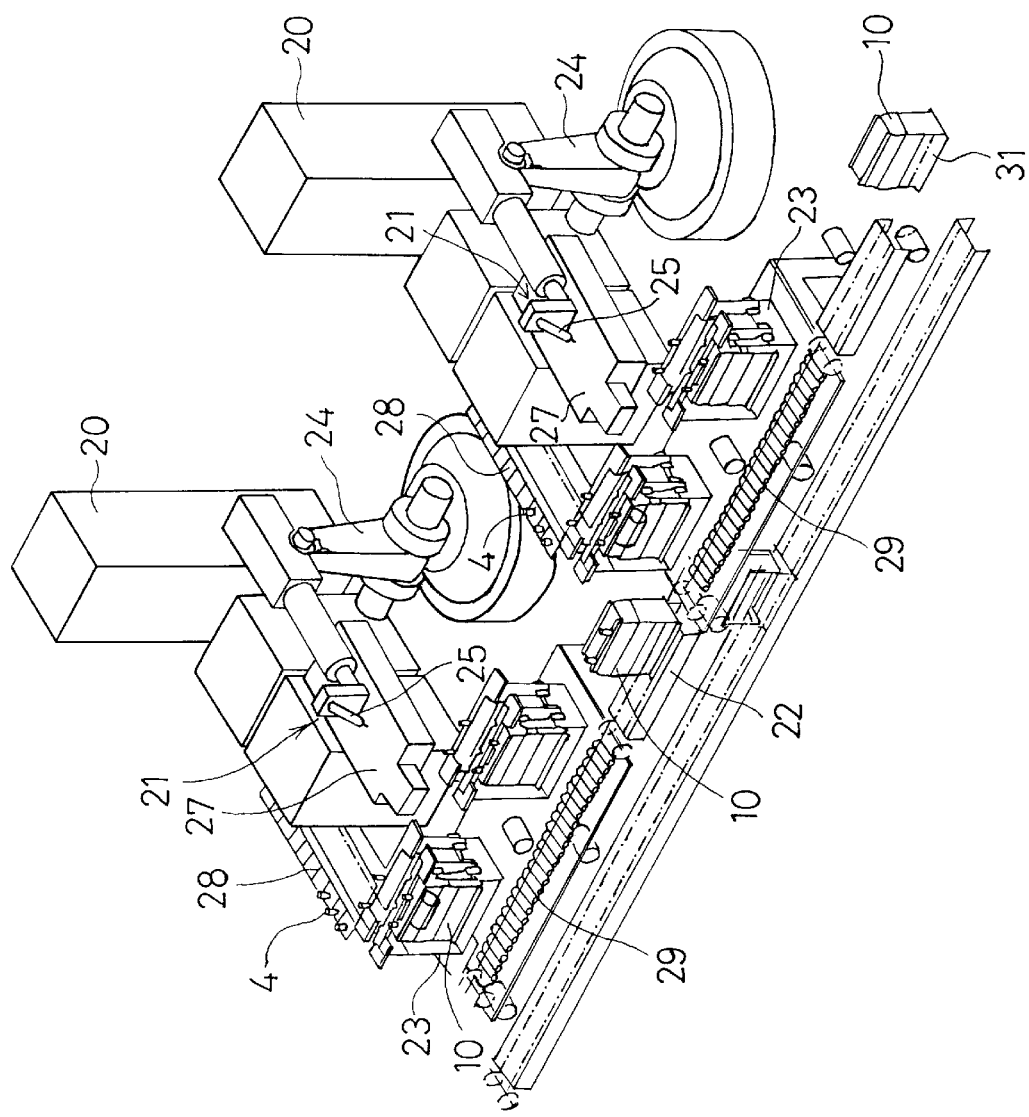
FIG. 1 is a perspective view showing a construction of a device for manufacturing an electrode plate assembly according to an embodiment of the present invention.

An embodiment of the present invention, which is provided to assist understanding thereof, is described below with reference to the appended drawings. Elements which are common with the prior art construction are given the same reference numerals, and further description is omitted.

Figure 2:
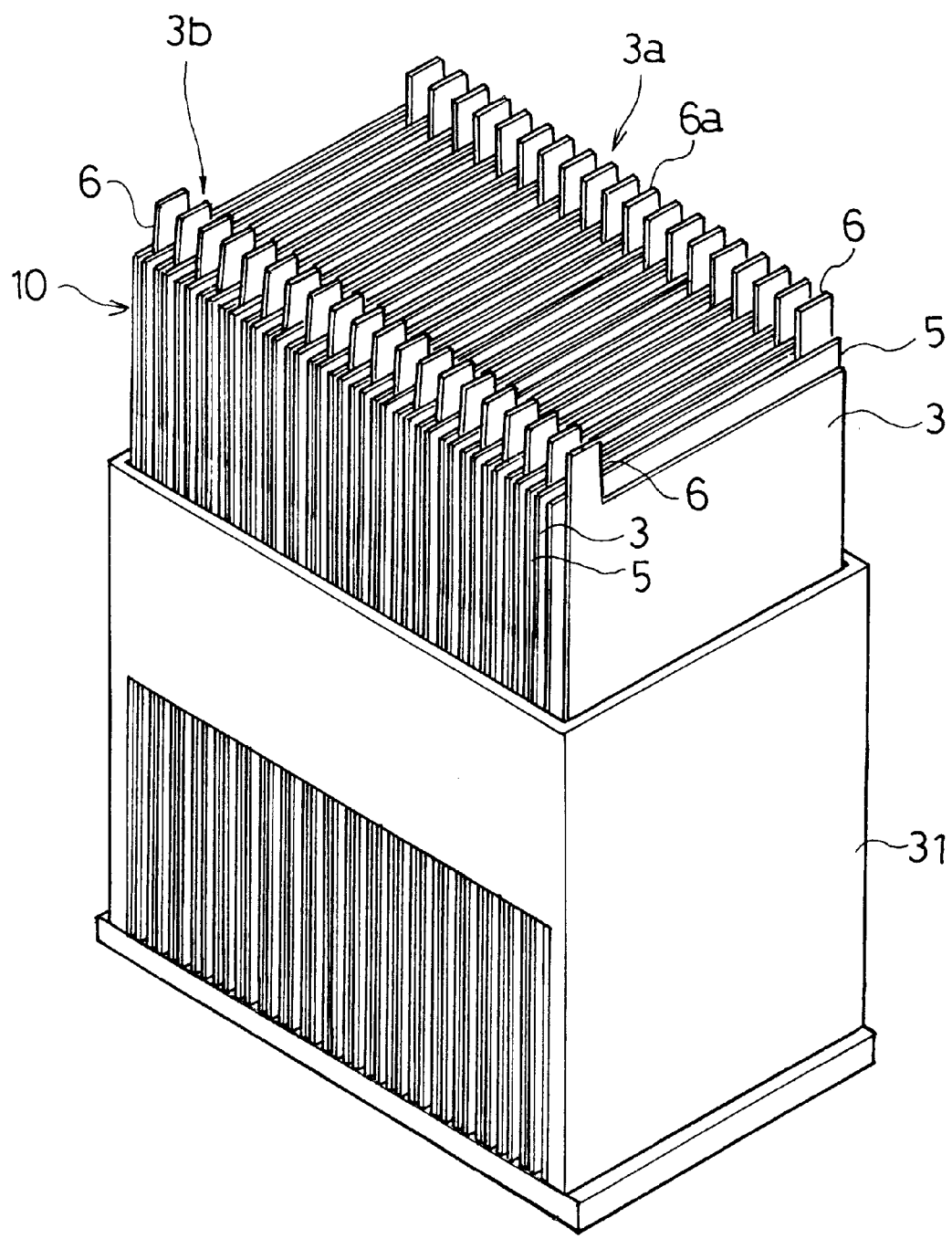
FIG. 2 is a perspective view showing an example of the construction of an electrode plate group.

FIG. 1 shows the overall construction of a device for manufacturing an electrode plate assembly according to an embodiment of the present invention. An electrode plate group 10 which constitutes a starting point for manufacture of an electrode plate assembly by formation of a strap 2 is, as shown in FIG. 2, accommodated in a transport case 31 for transportation to the manufacturing steps whilst being held in a condition with the electrode plates 3 of the positive and negative electrodes stacked with interposition of separators 5. In this condition, electrode plate group 10 is fed by means of feed rollers 29 with electrode plate leads 6 in an erect condition, on top, and is thus fed into the step for manufacturing the electrode plate assembly. The step of manufacturing an electrode plate assembly comprises a step of forming a positive electrode strap 2a provided with a positive electrode pillar electrode 4a for electrode plate lead row 3a on the positive electrode side of the two positive and negative electrodes and a step of forming a negative electrode strap 2b provided with a negative electrode pillar electrode 4b for the electrode plate lead row 3b on the negative electrode side.

Figure 3:
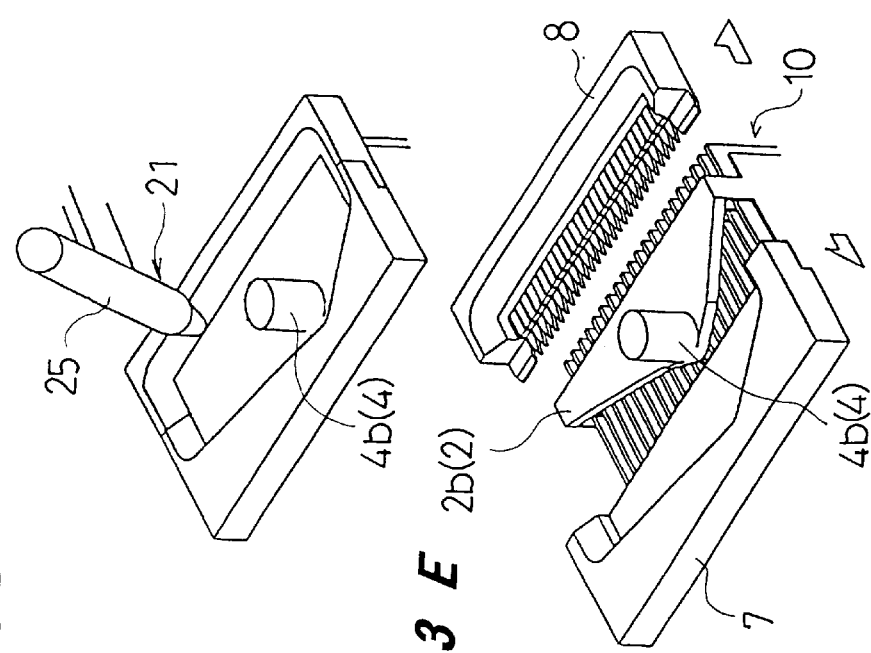
FIG. 3 is a perspective view showing a procedure for forming a strap and attachment/release of a welding jig on to the electrode plate group.
Figure 3:
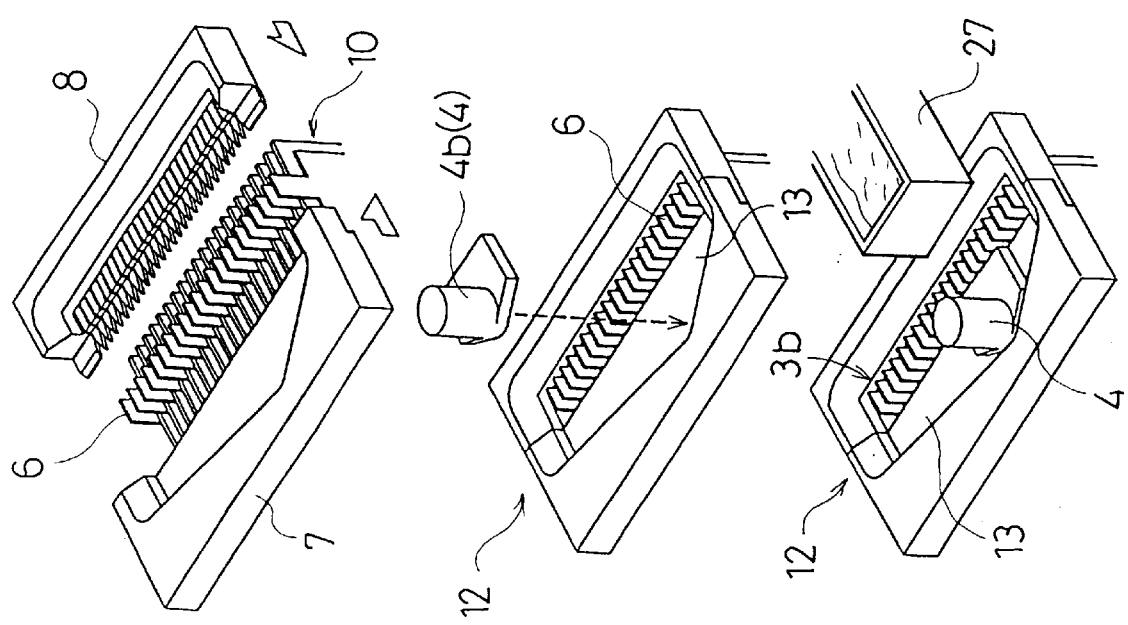

First of all, in the negative electrode strap-forming step, as shown in FIG. 3A, welding jig 12 is attached to negative electrode plate lead row 3b of electrode plate group 10 by means of a welding jig attachment device (means for attaching a welding jig) 23. Welding jig 12 is attached such that the comb teeth of comb element 8 are inserted into the spaces in the row arrangement of electrode plate leads 6, and mated with the mating element 7 attached from the opposite direction, recess 13 is formed on the top of welding jig 12 by abutment of recess portions formed on the upper surface on respective opposite sides. This recess 13 is formed of a shape corresponding to the external shape of strap 2. A pillar electrode 4, that is supplied from a pillar tray 28, is arranged as shown in FIG. 3B in a prescribed position of recess 13 formed on welding jig 12 that is attached.

Next, molten lead is poured into recess 13 as a molten lead supply device (means for pouring molten lead) 27 is moved, as shown in FIG. 3C, above negative electrode plate lead row 3b in recess 13 of welding jig 12. The molten lead that is poured in creates the shape of strap 2 by solidification and temporarily fixes electrode plate leads 6 and pillar electrode 4.

Next, molten lead supply device 27 is moved from above welding jig 12 and a shaft robot 24 having a plasma welding device (means for heating) 21 is driven, thereby moving a plasma torch 25 held at the tip of its arm above welding jig 12. As shown in FIG. 3D, the solidified lead is remelted by heating from above the solidified lead by means of the plasma torch 25 and, simultaneously, electrode plate leads 3 and the base of pillar electrode 4 are melted, thereby effecting integral joining of electrode plate leads 6 and pillar electrode 4 with the solidified lead 14 constituting strap 2.

Plasma torch 25 is retracted from the welding jig 12 by shaft robot 24, and negative electrode strap 2b is formed by re-solidification of the re-melted solidified lead and, as shown in FIG. 3E, the step of formation of negative electrode strap 2b is completed by pulling mating element 7 and comb element 8 apart by means of welding jig attachment/detachment device 23.

Electrode plate group 10 that has now been formed with negative electrode strap 2b is fed to inverting pallet 22 by feed rollers 29. Inverting pallet 22 is rotated through 180°, changing the direction of the electrode plate group 10 which is mounted thereon by 180°, so that positive electrode plate lead row 3a is fed to the positive electrode strap-forming step by feed rollers 29 towards the devices. In this embodiment since, the devices of the negative electrode strap-forming step and the devices of the positive electrode forming step are arranged in the same direction with respect to the direction of feed of feed rollers 29, electrode plate group 10 is inverted by the inverting pallet 22. However, if the devices in the two steps were arranged on both sides of the feed rollers 29, there would be no need for such inversion.

The step of forming the positive electrode strap is identical to the step of forming the negative electrode strap described above, so description thereof is omitted. The operation of the electrode plate assembly manufacturing device described above is controlled in accordance with a control program that is set beforehand in control device 20. An electrode plate assembly 1 obtained by forming the positive and negative electrode straps 2a and 2b on electrode plate group 10 is fed to the next step of manufacture of the lead accumulator by feed rollers 29.

It should be noted that, although, in the above-described step of manufacturing electrode plate assembly 1, welding jig 12 is arranged to be attached to and released from the negative electrode-side electrode plate lead row or positive electrode-side electrode plate lead row every time a negative electrode strap-forming step or positive electrode strap-forming step is performed, it would be possible to adopt a construction in which a welding jig was employed of unitary type for the positive and negative electrodes, embracing both the negative electrode side and positive electrode side simultaneously.

Figure 4:
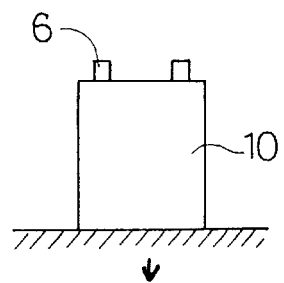
FIG. 4 is a flow chart sequence of manufacturing steps and characteristic processing steps in each item of the sequence.
Figure 4:
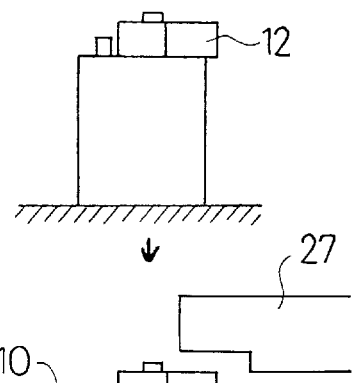
Figure 4:
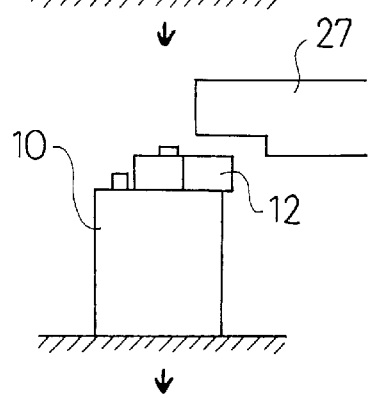
Figure 4:
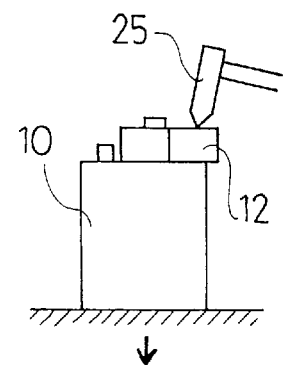
Figure 4:
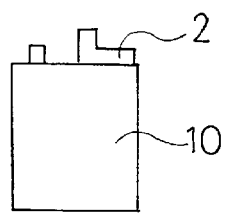

In FIG. 4, the procedures of the manufacturing steps of electrode plate assembly 1 as described above are shown in the sequence #1~#5. Further, in this embodiment, in procedure #3, there are adopted a construction whereby, even though an erect arrangement is used no dripping of molten lead occurs when poured, a construction whereby mixture of oxides with the molten lead forming strap 2 is avoided, and a construction for forming strap 2 of a constant thickness. In procedure #4, a construction is adopted for remelting the solidified molten lead and reliably joining electrode plate leads 6 and pillar electrodes 4 to strap 2. Characteristic structural features in this embodiment are described below.

Figure 5:
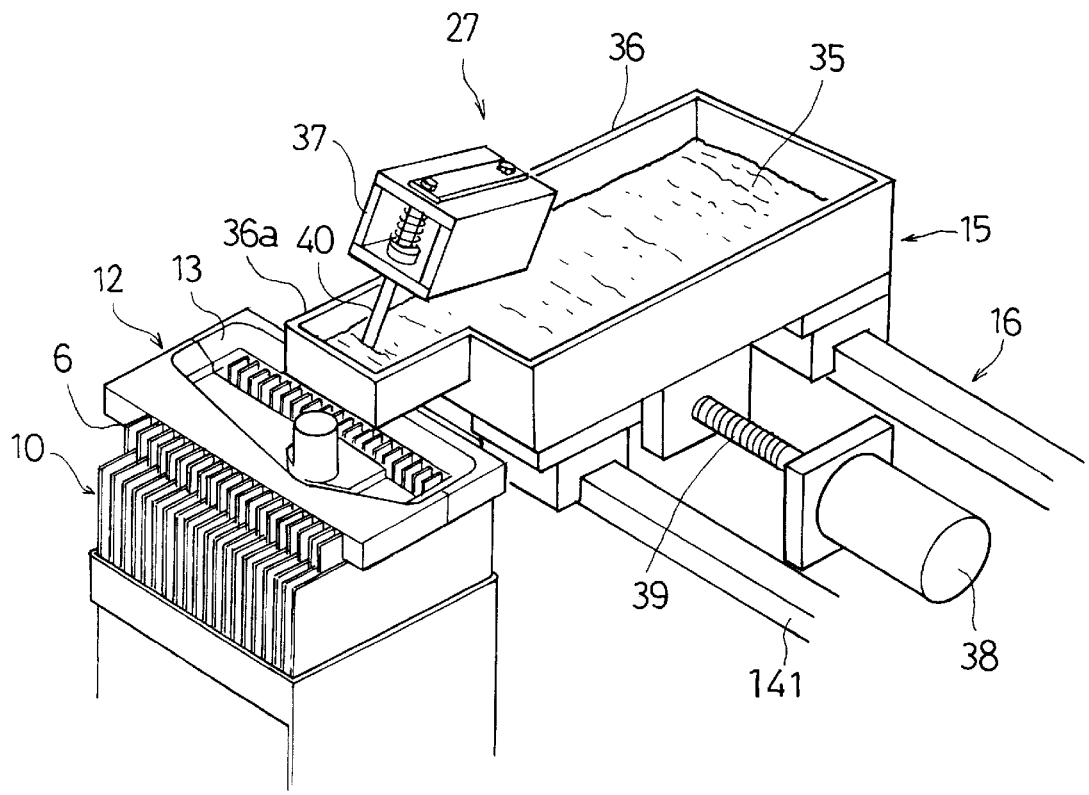
FIG. 5 is a perspective view showing a construction of a molten lead supply device.

As shown in FIG. 5, molten lead supply device 27 comprises a melting furnace 15 and a movement mechanism 16 that moves this melting furnace 15 parallel to the direction of arrangement of the row of electrode plate leads 6 of electrode plate group 10 arranged in a prescribed position. This melting furnace 15 comprises a reservoir 36 in which molten lead 35 that is melted by heating to 370~390° C. is accumulated, and a discharge control unit 37 that controls the amount of discharge of molten lead 35 and that opens and closes a discharge aperture 43a (see FIG. 6) that opens at the bottom of discharge portion 36a of this reservoir 36. The melting furnace 15 is moved such that discharge portion 36a is positioned above electrode plate group 10 by movement mechanism 16, and molten lead 35 is poured into recess 13 of welding jig 12 attached on electrode plate group 10. This movement mechanism 16 drives a bore screw 39 using a servo motor 38, so that melting furnace 15, linked to bore screw 39, is moved over movement rail 141.

Figure 6:
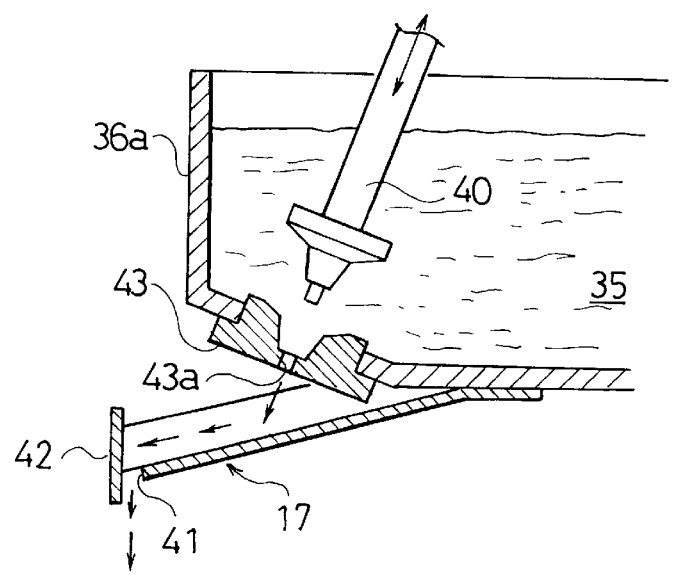
FIG. 6 is a cross-sectional view showing a pouring structure for molten lead.

FIG. 6 is a cross-sectional view showing a discharge element 43 having a discharge aperture 43a formed at the bottom of discharge portion 36a of the reservoir 36, and pouring nozzle 17 provided therebelow. The construction is such that discharge of molten lead 35 and stoppage thereof, and, in addition, adjustment of the amount of discharge of molten lead, can be adjusted by means of the amount of advance or retraction movement performed by a tip of an opening/closing rod 40 that is driven to advance or retract by means of the discharge control unit 37 in discharge element 43. Also, below discharge element 43, there is arranged a pouring nozzle 17 formed in the shape of a spout. Molten lead 35 discharged from discharge aperture 43a flows as shown by the arrows in the drawing and is poured into the recess 13 of welding jig 12 from the pouring aperture 41 formed below the tip.

In this way, since the molten lead 35 is discharged from the bottom of reservoir 36, discharge of lead oxides generated at the surface of the molten lead is avoided, so there is no admixture of lead oxides with the molten lead 35 that is poured into the recess 13 for forming as strap 2. Thus, formation of strap 2 of excellent quality can be achieved.

Figure 7A:
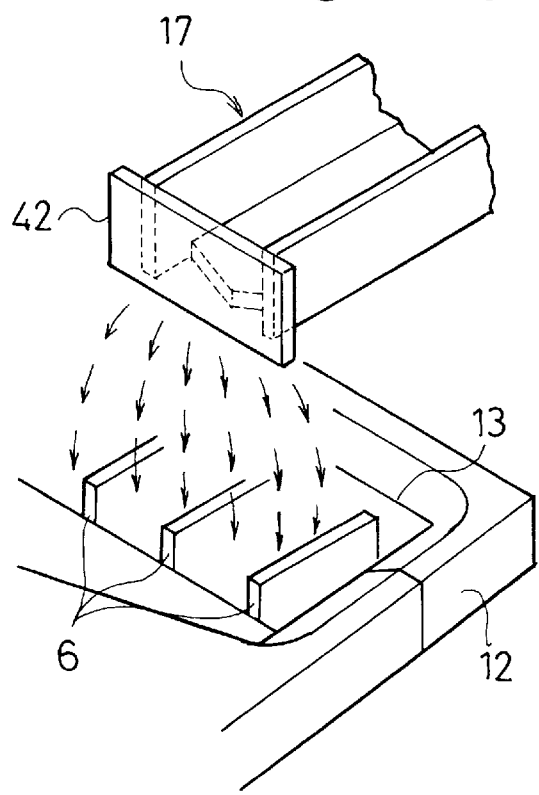
Figure 7A:
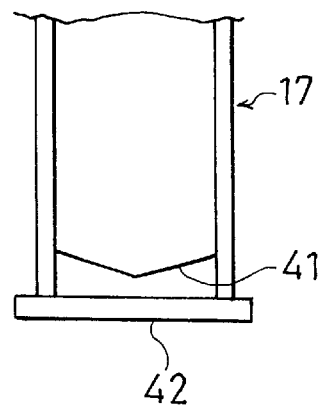

As shown in FIGS. 7A and 7B, the pouring nozzle 17 is formed in a shape of a spout with a flat bottom. A diffusion plate (screening plate) 42 is provided at the end in the downstream direction of molten lead 35. At the position where the bottom face of pouring nozzle 17 meets this diffusion plate 42, as shown in FIG. 7B, there is formed a pouring aperture 41 whose aperture width widens towards both ends. When molten lead 35 is poured from pouring nozzle 17 constructed in this way, as shown in FIG. 7A, molten lead 35 forms a fan shape spreading out in the direction of the row of electrode plate leads 3, and is poured into recess 13 of welding jig 12. Regarding this arrangement, the present inventors conducted a large number of pouring tests using various shapes of pouring nozzle to obtain the optimum condition. The benefits of the arrangement shown in FIGS. 6, 7A, and 7B will now be described.

Figure 8:
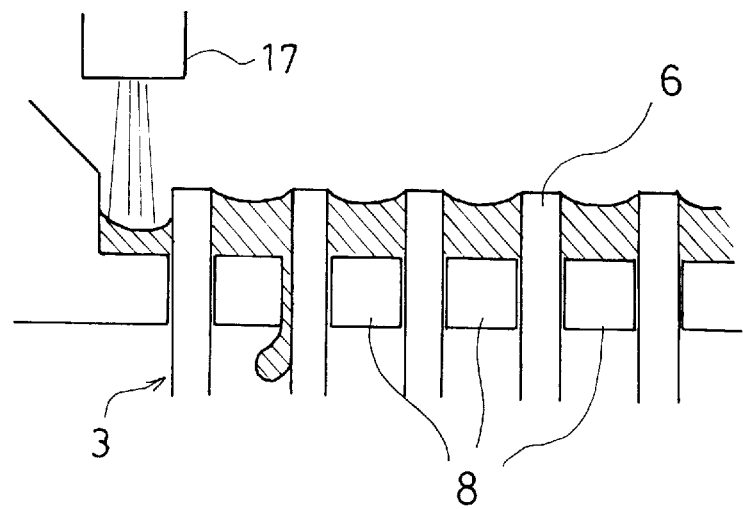
FIG. 8 is a cross-sectional view of all electroplate group showing problems that arise when pouring molten lead in the case where the electrode plate group is in an erect condition.

When welding jig 12 is attached on the electrode plate lead row with electrode plate group 10 in an erect condition with electrode plate leads 6 directed upwards and molten lead is poured into the recess 13 of welding jig 12, as shown in FIG. 8, so-called "drips" may be produced in which molten lead penetrates between electrode plates 3 through a gap between electrode plate leads 6 and comb element 8 that is inserted between the row of electrode plate leads 6, producing short circuiting of electrode plates 3. The gap between comb element 8 and electrode plate leads 6 is produced by error in the thickness of formation of electrode plate leads 6. If, in an effort to eliminate such gaps, the width of the comb teeth of comb element 8 is set on the large side and the comb element is fitted forcefully, it causes considerable risk of damaging electrode plate leads 6 on attachment of welding jig 12 or of abraded material falling in-between electrode plates 3. In fact, the production of a gap of about 0.2~0.4 mm is therefore unavoidable. In the conventional method of forming strap 2, in order to prevent dripping of molten lead, it was necessary to tip the electrode plate group 10 over sideways (see FIG. 16). The present construction is arranged such that such dripping cannot occur even when the molten lead is poured in a condition with the electrode plate group 10 upright instead of being tipped over sideways.

In the present construction, even though the molten lead is poured in in the direction of the gap produced between the comb element 8 and electrode plate leads 6 and electrode plate group 10 being arranged with electrode plate leads 6 directed upwardly, in order to prevent entry of molten lead through the aforesaid gap into the spaces between the electrode plates 3, a construction is adopted whereby the flow speed of the molten lead that is poured in is lowered and the temperature of the molten lead that is poured in is rapidly lowered.

First of all, as the means for lowering the flow speed of the molten lead, a pouring nozzle 17, constructed as shown in FIG. 6, is mounted at the bottom of reservoir 36 with an angle of inclination such that the molten lead 35 flows smoothly along it. Molten lead 35 that has flowed down through pouring nozzle 17 collides with diffusion plate 42 that is provided at the tip of pouring nozzle 17, with the result that its flow speed is immediately lowered. Even though the flow speed of the molten lead 35 is lowered, since pouring aperture 41 directly therebelow is open, it flows down from pouring aperture 41 and is poured into recess 13 of welding jig 12. By the lowering of its pouring speed into this recess 13, the pressure with which it penetrates the gap between comb element 8 and electrode plate leads 6 is lowered, so that, in combination with the lowering of temperature of the molten lead, to be described, occurrence of dripping is effectively prevented.

Next, the means whereby the temperature of the molten lead that is poured into recess 13 is rapidly lowered includes the the molten lead being dispersed a fan fashion as shown in FIG. 7A, by being discharged from a pouring aperture 41 of aperture shape as shown in FIG. 7B. This dispersion of the molten lead effectively lowers its temperature. The temperature is also lowered due to the fact that molten lead 35 flows down through a pouring nozzle 17 in the form of a spout with a flat bottom face and that is open to the atmosphere, and due to the fact that turbulence of the flow is produced when the molten lead collides with the diffusion plate 42. The temperature of molten lead 35 when it is accumulated in reservoir 36 is maintained at 370~390° C., but, since the melting point of lead is 327.4° C., when its temperature drops to about 330° C., it solidifies. Consequently, if, by means of this construction, a suitable drop in temperature is produced prior to pouring into the recess 13, since there is a rapid drop of temperature on contacting the welding jig 12 and electrode plate leads 6, in combination with the reduction in flow speed described above, solidification occurs before the molten lead enters the gap between comb element 8 and electrode plate leads 6, so occurrence of drips is effectively prevented.

Figure 9A:
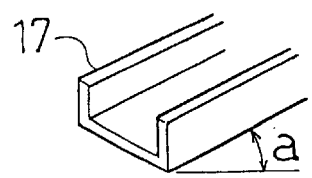

FIGS. 9A–G show the results obtained by studying various pouring aperture constructions of pouring nozzle 17. Repeated pouring tests were conducted using pouring aperture constructions aimed at obtaining a flow speed and temperature of the molten lead such as would not cause dripping of the molten lead. Specifically, the constructions tested included width, shape and angle of inclination of pouring nozzle 17, aperture shape of pouring aperture 41, and the presence or absence of a screening plate 42. The rate of occurrence of dripping was investigated. The constructions of pouring nozzle 17 shown in FIGS. 9A to 9C adopt a flat shape in the form of a spout. According to the tests, with the first shape of pouring nozzle shown in FIG. 9A, there was no benefit and lead adhered to the spout. With the second shape shown in FIG. 9B, occurrence of dripping reduced somewhat but not to zero, and lead "icicles" attached to the tip of spout. With the third shape shown in FIG. 9C, although the attachment of lead icicles to the tip was reduced, the rate of occurrence of dripping was unchanged. FIGS. 9D–9G show the construction which are provided with diffusion plate. FIG. 9D and 9F are respective top plan views of FIGS. 9E and 9G along the arrow A. With the construction shown in FIGS. 9D and 9E, some improvement was achieved in rate of occurrence of dripping but not zero. In FIGS. 9F and 9G, which show currently-adopted shape according to the present invention, the angle of dispersion plate as well as the shape of the spout tip are altered. With this construction, lead is discharged spreading out into the form of a fan and the rate of occurrence of dripping is reduced to zero. As set forth above, the construction of the present invention shown in FIGS. 9F and 9G is effective in preventing dripping of the molten lead.

Figure 10A:
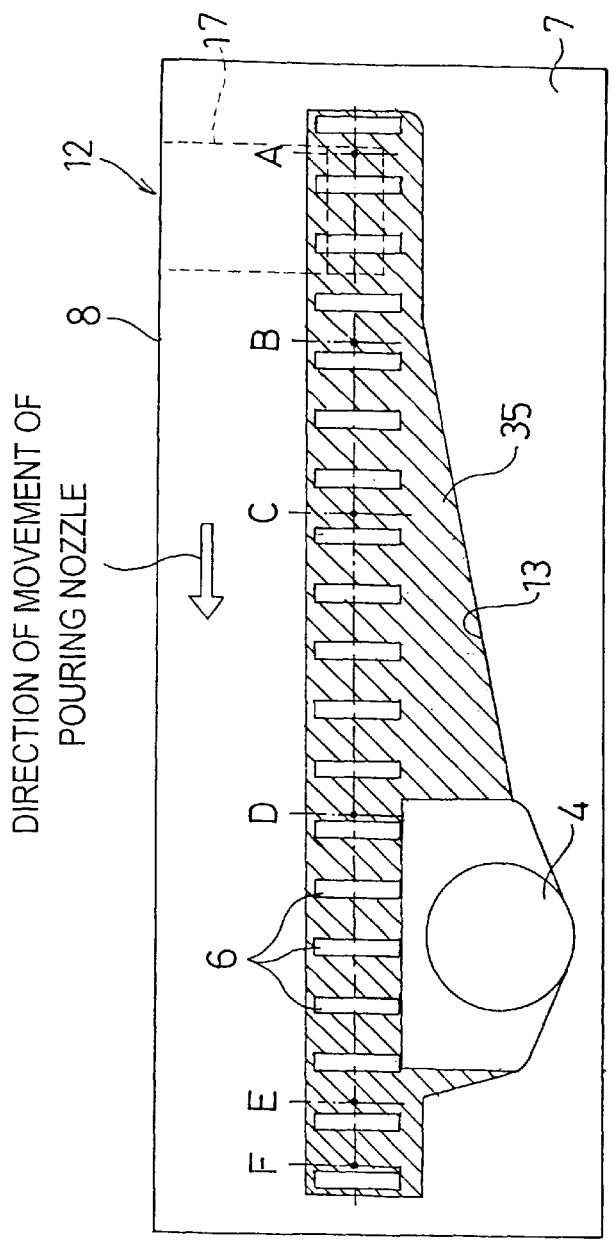
FIG. 10A is a plan view of a welding jig showing the condition in which molten lead is filled and FIG. 10B is a graph illustrating control of a pouring amount corresponding to the volume of the filling position of the molten lead.

FIG. 10A is a plan view showing the condition when molten lead 35 is poured in by the above construction into recess 13 of welding jig 12. The shaded portion in the Figure is the molten lead 35 that is poured in, of which an outside shape is that of strap 2. As shown by the arrow in the Figure, pouring nozzle 17 pours the molten lead 35 whilst moving in the direction of the row of electrode plate leads 6. Since the width in the direction orthogonal to the direction of movement of pouring nozzle 17 is different at each location that is filled by molten lead 35, if pouring of molten lead 35 is effected with a fixed discharge rate, uniform thickness will not be formed. Accordingly, in order to effect pouring with a different rate of filling of molten lead 35 at each location that is filled, adjustment is effected such that molten lead 35 is discharged with a fixed flow rate from pouring nozzle 17, but control is exercised such as to alter the speed of movement of pouring nozzle 17 for each location of movement.

Figure 10B:
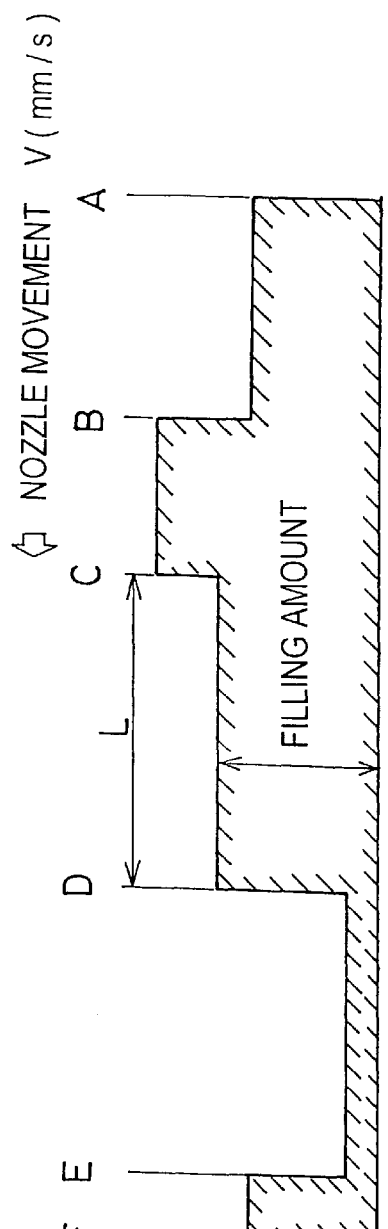

FIG. 10B shows the amount of filling corresponding to the speed of movement of pouring nozzle 17 at each filling location corresponding to the shape shown in FIG. 10A. For example, the amount of filling (g) when movement is effected through a distance L between C-D can be calculated in accordance with the equation (1) below, if the fixed discharge rate from pouring nozzle 17 is taken as Q (g/sec), and the speed of movement of pouring nozzle 17 is taken as V (mm/sec).

$$\text{Filling amount} = Q \times L/V \quad (1)$$

The rate of discharge from pouring nozzle 17 is controlled by means of discharge control unit 37 such that the rate of discharge from discharge aperture 43a is a fixed quantity Q, this being achieved by varying the amount of insertion of opening/closing rod 40 into discharge aperture 43a of discharge element 43, by adjusting the advance/retraction drive amount of opening/closing rod 40 by means of discharge control unit 37. Also, the speed of movement V of pouring nozzle 17, may be performed by control of rotation of servo motor 38, controlling the speed of movement of melting furnace 15 by movement mechanism 16.

Figure 11A:
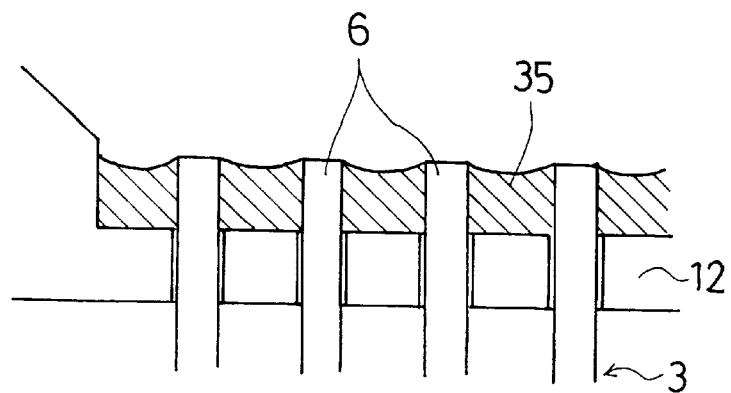
FIG. 11A is a cross-sectional view showing the condition prior to heating, given in explanation of joining by remelting the solidified lead.
Figure 11A:
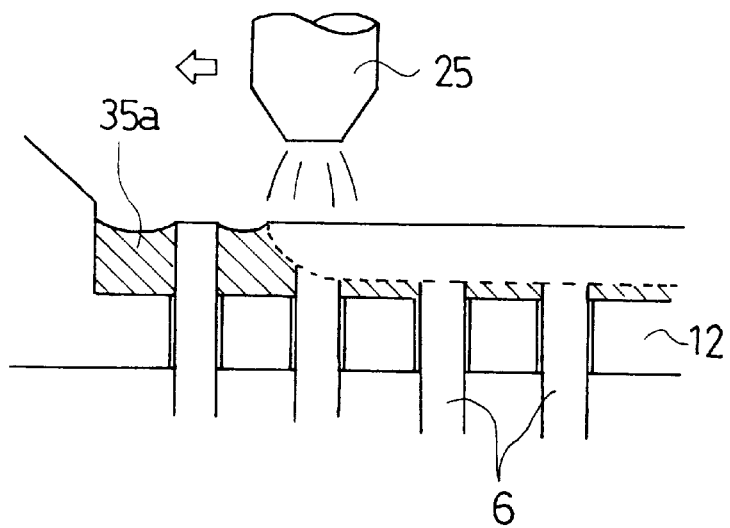
Figure 11A:
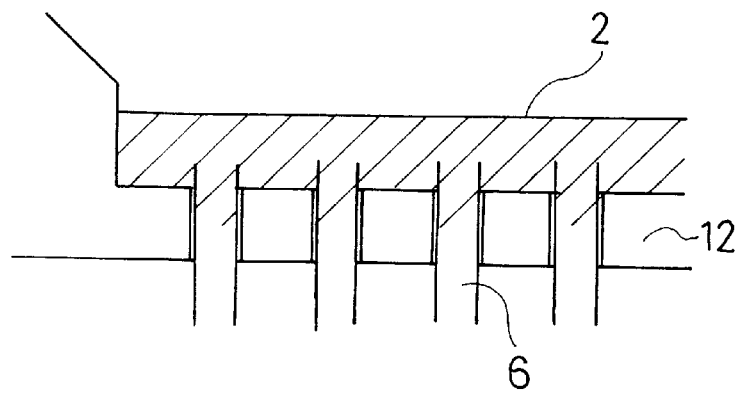

The condition in which molten lead 35 is filled into recess 13 of welding jig 12 as described above is as shown in FIG. 10A. Electrode plate leads 6 and the base of pillar electrode 4 are temporarily fixed in the shape of strap 2 by the solidification of this molten lead 35. However, electrode plate leads 6 and pillar electrode 4 are not in a perfectly connected condition electrically, due to the presence of oxide film or contamination at the surface of electrode plate leads 6 and pillar electrode 4. Remelting is therefore performed using a plasma welding device as described above in order to effect a perfect joint between electrode plate leads 6 and pillar electrode 4. FIG. 11A shows in cross-section the condition in which molten lead 35 is filled into recess 13 of welding jig 12 and is solidified. As shown in FIG. 11B, heating is performed from the surface using a plasma torch 25, melting the solidified lead 35a and electrode plate leads 6 and the base of pillar electrode 4, thereby fusing these and achieving a perfect joint. In the plasma welding using the plasma torch 25, heating is performed by arc plasma in the central region whilst blowing a mixed gas consisting of inert gas and reducing gas from the periphery of the tip of plasma torch 25. There is therefore no production of lead oxide, and, since heating is effected in a concentrated manner, little strain is generated, and the electrode plate leads 6 and the base of pillar electrode 4 and its surroundings can be heated and melted in a concentrated manner. As shown in FIG. 11B, in the remelting performed by heating by the plasma torch 25, the speed of movement and/or the output power of plasma torch 25 are controlled such that melting proceeds to a fixed depth. According to this control, the side of electrode plate leads 6 facing electrode plates 3 is not exposed to a direct flame, so the problem of the prior art of occurrence of conduction heating due to melted portions of electrode plate leads 6 projecting towards the electrode plate free side is solved.

Figure 12:
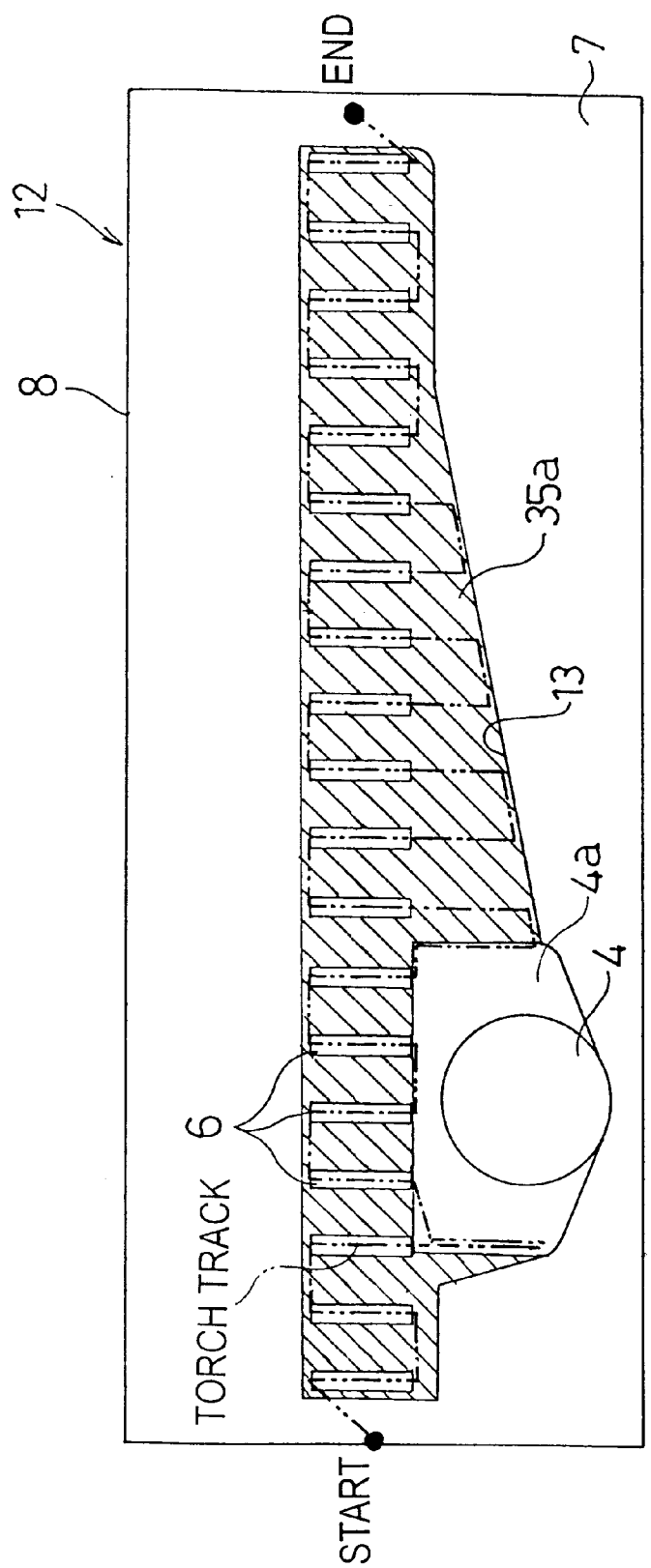
FIG. 12 is a diagram of a track of motion showing the track along which a plasma torch is moved.

Furthermore, as shown in FIG. 12, the operation of shaft robot 24 that holds plasma torch 25 is controlled such that plasma torch 25 is made to move along a track that traces electrode plate leads 6 and the base 4a of pillar electrode 4. By such control of the movement track of plasma torch 25, the melting of electrode plate leads 6 and pillar electrode 4 and solidified lead 35a in its vicinity is prioritised, and, as shown in FIG. 11C, electrode plate leads 6 and pillar electrode 4 are integrally fused and joined to form strap 2.

As described above, the series of operations from introduction of electrode plate group 10 into the manufacturing steps up to attachment of the welding jig, pouring of molten lead, remelting by plasma welding, and completion of electrode plate assembly 1 by removing the welding jig are controlled in accordance with a pre-set control program in accordance with the type of electrode plate assembly of the lead accumulator that is to be manufactured, enabling an electrode plate assembly of stable quality to be manufactured by automatic operation. The arrangement whereby these manufacturing steps are executed, shown in FIG. 1, is an arrangement in which the devices of each processing step are laid out on a straight line but, as shown in FIG. 13, it would also be possible to arrange to manufacture electrode plate assemblies 1 by disposing the various processing steps along a periphery, and effecting forward feed of electrode plate groups 10 to each processing step on this peripheral track whose centre is taken as a centre of rotation.

Figure 13:
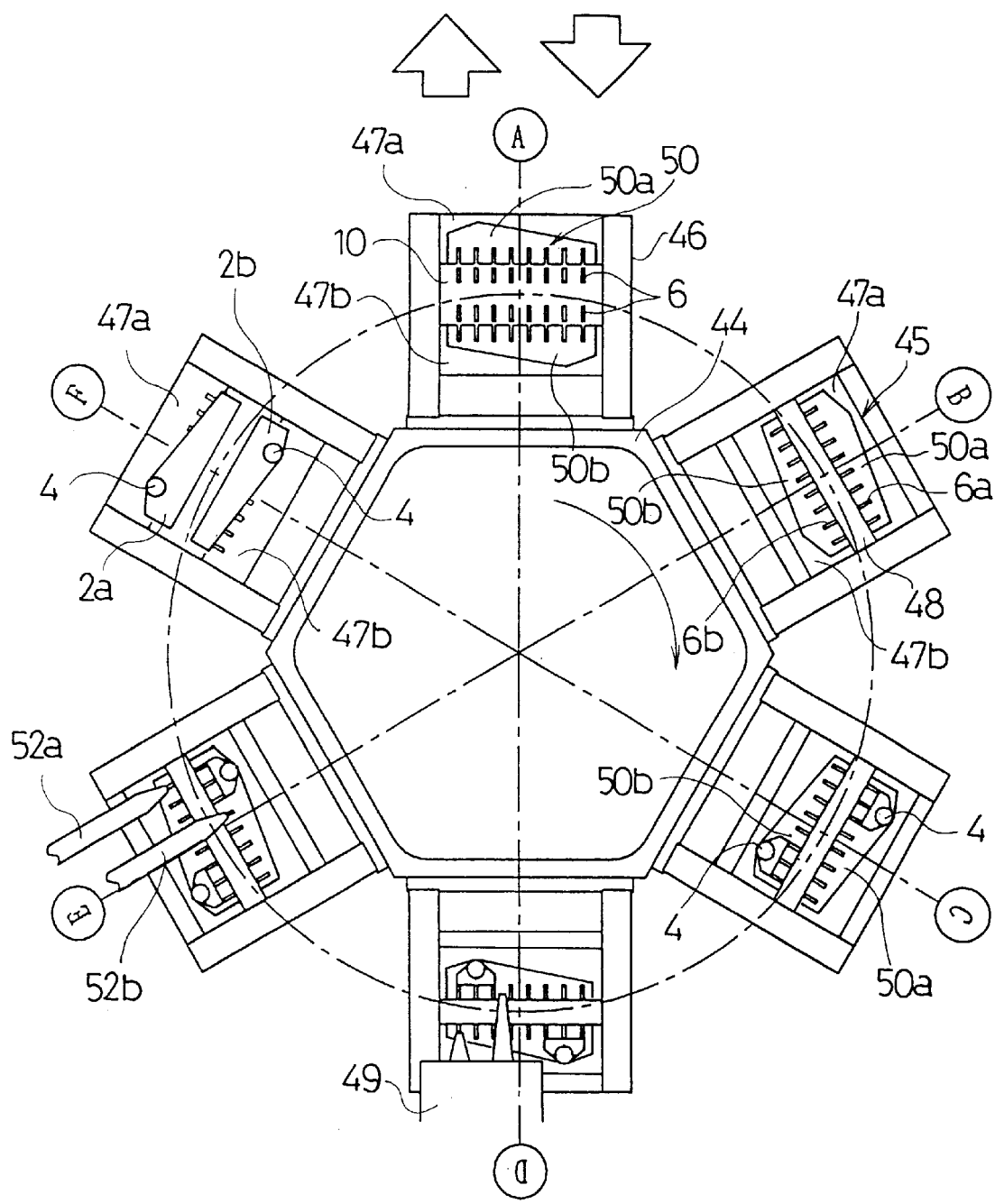
FIG. 13 is a plan view showing a layout of a device for manufacturing an electrode plate assembly constructed as a rotary system.
Figure 14:
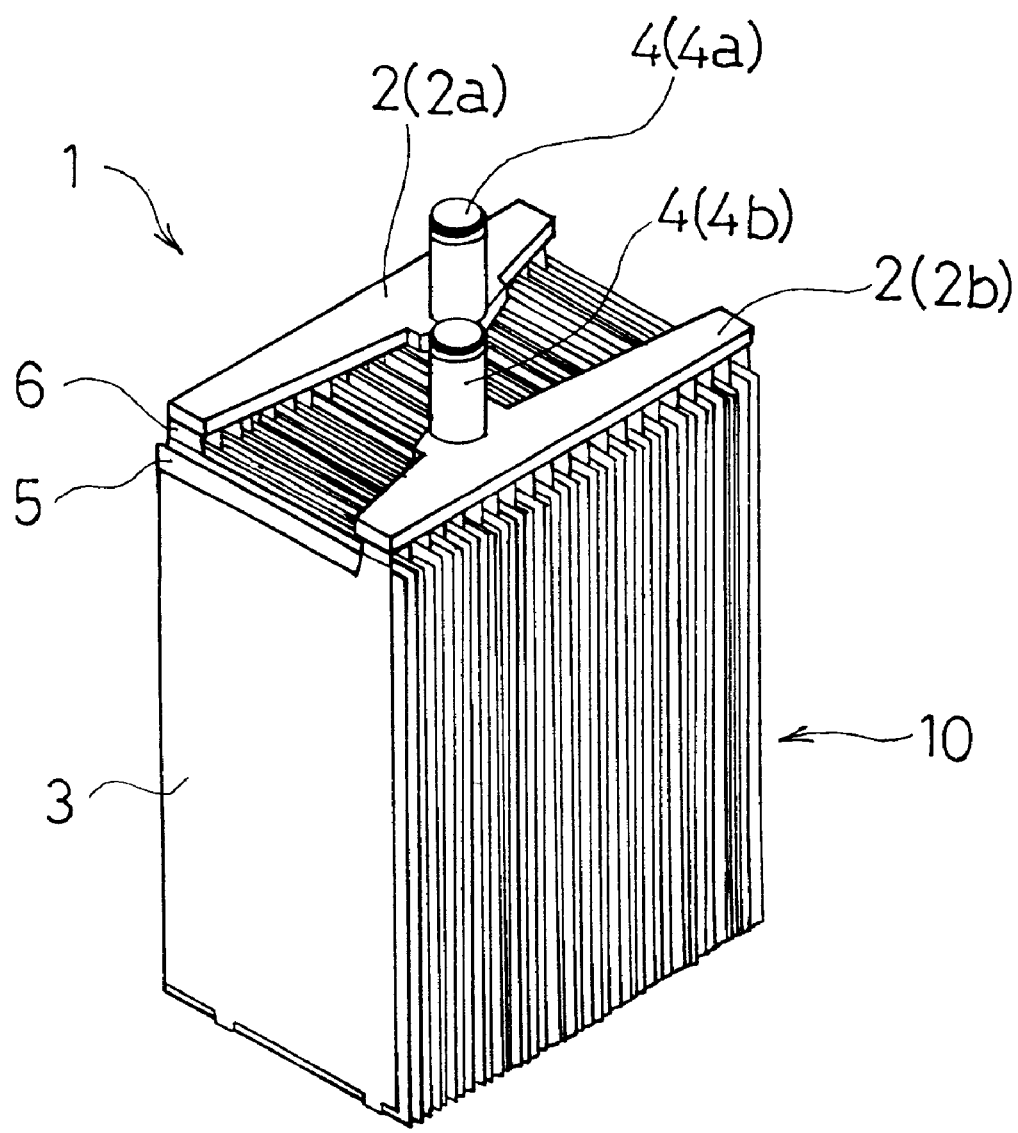
FIG. 14 is a perspective view showing an example of an electrode plate assembly.
Figure 15A:
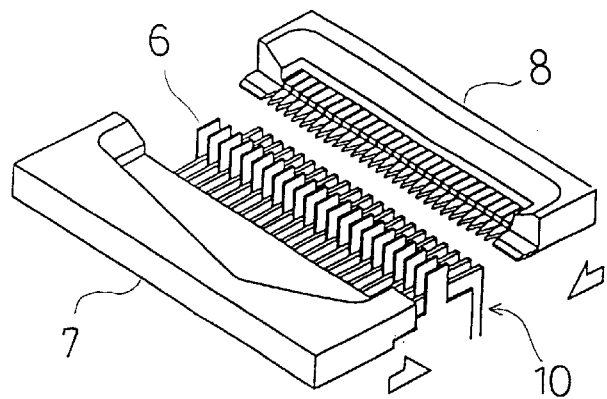
FIG. 15 is a perspective view showing the procedure for forming a strap in accordance with the prior art.
Figure 15A:
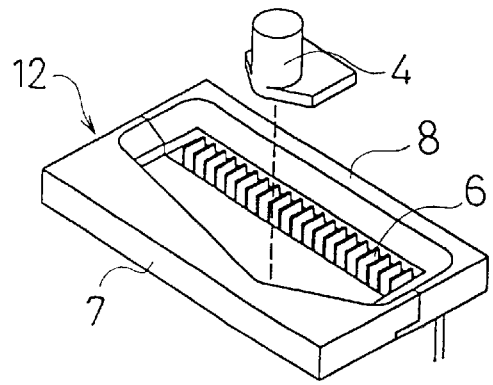
Figure 15A:
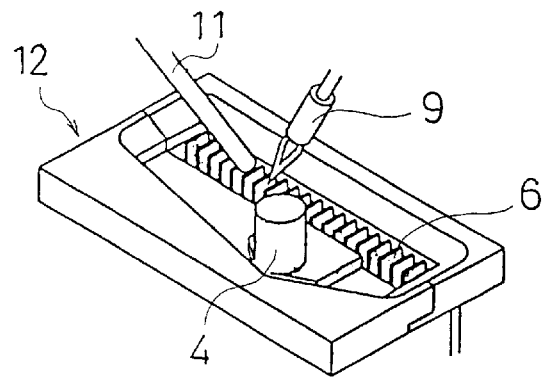
Figure 15A:
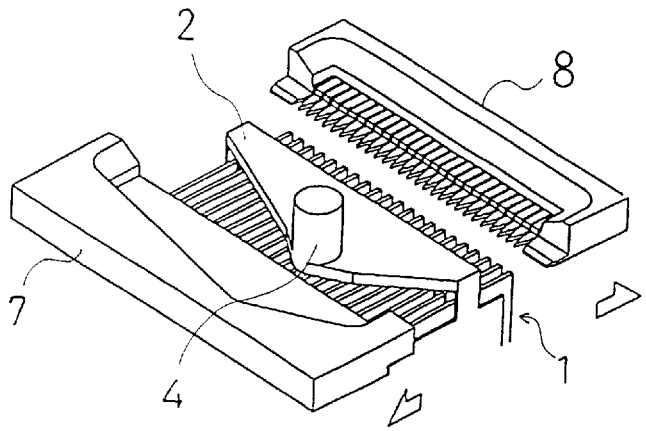

In FIG. 13, the arrangement is such that successive movement can be effected to each of processing steps A~F by forward feed rotation of a rotary drum 44 that is driven in rotation by a rotational angle of ⅙ of the circumference at prescribed time intervals. An electrode plate group holding table 46 is provided with a welding jig 45 at six locations on the circumference of rotary drum 44. Of the processing steps A~F, A is an introduction/discharge position at which an electrode plate group 10 is introduced into the device and at which a completed electrode plate assembly 1 is discharged. B is a welding jig attachment position at which a welding jig 45 is attached on electrode plate group 10 held in electrode plate group holding table 46. C is a pillar electrode supply position at which pillar electrodes 4 are arranged at a prescribed position of recess 50 of welding jig 45. D is a molten lead pouring position at which molten lead is poured into recess 50. E is a joining position at which joining is effected by melting the solidified lead, electrode plate leads 6 and pillar electrode 4. F is a welding jig removal position in which the welding jig is removed from electrode plate group 10 which has been formed with strap 2.

The construction and processing method for forming strap 2 in these processing steps are the same as the construction and method described above. However, the characteristic feature of this construction is that straps 2 (2a, 2b) can be formed concurrently for the positive electrode plate lead row and the negative electrode plate lead row. In order to achieve this, in welding jig 45, there are provided a pair of comb elements 47a, 47b on electrode plate group holding table 46. With respect to an electrode plate group 10 that has been introduced at position A, comb element 47a is attached on the row of electrode plate leads 6a on the positive electrode side at position B, while comb element 47b is attached on the row of electrode plate leads 6b on the negative electrode side, and a mating element 48 is inserted between these comb elements 47a and 47b. By attachment of this welding jig 45, the row of electrode plate leads 6a on the positive electrode side and the row of electrode plate leads 6b on the negative electrode side are accommodated in recesses 50a, 50b formed in respective comb elements 47a, 47b.

Regarding the recesses 50a and 50b at these two locations, pillar electrodes 4, 4 are located at position C, and molten lead is poured into recesses 50a, 50b from molten lead supply device 49 at position D. Furthermore, at position E, joining of the solidified molten lead and electrode plate leads 6a, 6b and pillar electrodes 4, 4 is effected by means of a pair of plasma torches 52a, 52b. At position F, the straps 2a, 2b on the positive and negative electrode rows of electrode plate leads 6 are formed by removing welding jig 45, thereby completing the electrode plate assembly 1.

While a preferred embodiment of the invention has been described using specific terms, such description is for illustrative purposes only, and it is to be understood that changes and variations may be made without departing from the spirit or scope of the following claims.

What is claimed is:

1. A method of manufacturing an electrode plate assembly for a lead accumulator wherein:

an electrode plate group is formed by alternately stacking a plurality of positive and negative electrode plates with interposition of separators and with respective electrode plate leads projecting from said positive and negative electrode plates aligned in electrode rows for positive and negative terminals; and a strap is formed respectively joining said electrode plate leads and pillar electrodes in said electrode rows, the method comprising the steps of:

orienting the electrode plate leads directed upwards;

attaching a welding jig having a recess corresponding to an external shape of said strap and comb teeth at a bottom face of the recess to each of said electrode lead rows such that said comb teeth are interposed between said electrode plate leads and define gaps between said comb teeth and said electrode plate leads;

placing said pillar electrodes at a prescribed position in the recesses; and pouring molten lead into said recesses at a temperature and pressure which prevent the molten lead from flowing through said gaps and forming drips below said welding jigs.

2. A method of manufacturing an electrode plate assembly for a lead accumulator wherein:

an electrode plate group is formed by alternately stacking a plurality of positive and negative electrode plates with interposition of separators and with respective electrode plate leads projecting from said positive and negative electrode plates aligned in electrode rows for positive and negative terminals; and a strap is formed respectively joining said electrode plate leads and pillar electrodes in said electrode rows, the method comprising the steps of:

orienting the electrode plate leads directed upwards;

attaching a welding jig having a recess corresponding to an external shape of said strap electrode plate group with said electrode plate lead rows accommodated in the recess by insertion of and comb teeth at a bottom face of the recess to each of said electrode lead rows such that said comb teeth are interposed between said electrode plate leads and define gaps between said comb teeth and said electrode plate leads;

placing said pillar electrodes at a prescribed position in the recesses;

pouring a prescribed quantity of molten lead from a pouring aperture, communicated with a melting furnace, into the recesses in the welding jigs such that the molten lead fans out in a direction of the electrode rows, when leaving said pouring aperture and prior to pooling in said recesses, to promote radiation of heat and in a condition in which a pouring pressure due to flow speed is suppressed;

fixing together the electrode plate leads and said pillar electrodes by solidification of the poured molten lead into solidified lead;

applying heat to areas of the electrode plate leads and the pillar electrodes in the solidified lead to melt in the areas the solidified lead, said electrode plate leads, and bases of the pillar electrodes to integrally join the electrode plate leads and the pillar electrodes and thereby form the straps; and removing said welding jig leaving the straps on the electrode lead rows.

3. The method of manufacturing an electrode plate assembly for a lead accumulator according to claim 2 wherein the pouring of the molten lead is effected while moving said pouring aperture along a direction of a respective one the electrode rows at a speed controlled corresponding to a pouring location along the electrode row, whilst keeping a discharge rate of the molten lead fixed.

4. The method of manufacturing an electrode plate assembly for a lead accumulator according to claim 2 wherein, in the step of pouring in the molten lead, said pouring aperture is moved along a direction of a respective one of the electrode rows while a rate of discharge from the melting furnace is controlled in accordance with a location to which the pouring aperture has moved.

5. The method of manufacturing an electrode plate assembly for a lead accumulator according to claim 2 wherein the melting furnace has a reservoir containing the molten lead and the molten lead is discharged and poured from a bottom portion of the reservoir through a spout having said pouring aperture and which extends external of the reservoir thereby radiating heat from the molten lead.

6. The method of manufacturing an electrode plate assembly for a lead accumulator according to claim 2 wherein a heating device is used to apply heat to the solidified lead and movement of the heating device over said areas is controlled so as to follow a prescribed tracing path corresponding to a shape of the electrode plate leads and the bases of the pillar electrodes.

7. A device for manufacturing an electrode plate assembly for a lead accumulator wherein:

an electrode plate group is formed by alternately stacking a plurality of positive and negative electrode plates with interposition of separators and with respective electrode plate leads projecting from said positive and negative electrode plates aligned in electrode rows for positive and negative terminals; and a strap is formed respectively joining said electrode plate leads and pillar electrodes in said electrode rows, the device comprising:

welding jigs having a recess corresponding to an external shape of said strap and comb teeth at a bottom face of the recess for interposition between said electrode plate leads and which define gaps between said comb teeth and said electrode plate leads;

means for installing and removing said welding jigs to said electrode rows and disposing the pillar electrodes in a prescribed position in the recess;

a melting furnace with a reservoir for containing molten lead and a pouring aperture from which the molten lead is poured;

means for pouring the molten lead whereby a prescribed quantity of the molten lead is poured via said pouring aperture into the recess in the welding jig, said pouring aperture being configured such that the molten lead fans out in the direction of the electrode rows, when leaving the pouring aperture and prior to pooling in said recess, to promote radiation of heat and in a condition in which the pouring pressure due to flow speed is suppressed; and means for heating areas of the electrode plate leads and the pillar electrodes after the molten lead turns to solidified lead, to melt and join the solidified lead, the electrode plate leads, and a base of the pillar electrodes.

8. The device for manufacturing an electrode plate assembly for a lead accumulator according to claim 7 wherein the pouring aperture is formed at an end of a spout communicated with a discharge aperture formed in a bottom portion of said reservoir.

9. The device for manufacturing an electrode plate assembly for a lead accumulator according to claim 8 wherein the spout has flat bottom face and a screening plate at a downstream end of the spout defining the pouring aperture between the screening plate and an end of said flat bottom face such that a direction of elongation of the pouring aperture is in the direction of the electrode rows.

10. The device for manufacturing an electrode plate assembly for a lead accumulator according to claim 9 wherein said pouring aperture is formed having a width in a flow direction which increases towards both ends in the direction of elongation.

11. The device for manufacturing an electrode plate assembly for a lead accumulator according to claim 7 wherein the means for heating is a welding device that effects melting whilst blowing a mixed gas containing reducing gas.

12. The device for manufacturing an electrode plate assembly for a lead accumulator according to claim 11 wherein the means for heating include means for moving said welding device at a speed such that a depth of melting of the solidified lead, the electrode plate leads, and the bases of the pillar electrodes does not reach the bottom face of the recess of the welding jig.

13. The device for manufacturing an electrode plate assembly for a lead accumulator according to claim 7 wherein the means for heating includes means for moving heat applied along a prescribed melting path that traces areas of the electrode plate leads and the bases of the pillar electrodes.

14. The method of claim 1 wherein said molten lead is maintained at a temperature in a range of 370° C. to 390° C. prior to pouring.

15. The method of claim 2 wherein said molten lead is maintained at a temperature in a range of 370° C. to 390° C. prior to pouring.

16. The method of claim 5 wherein said molten lead is maintained at a temperature in a range of 370° C. to 390° C. prior to pouring.

17. The method of claim 6 wherein said molten lead is maintained at a temperature in a range of 370° C. to 390° C. prior to pouring.

18. The method of claim 7 wherein said molten lead is maintained at a temperature in a range of 370° C. to 390° C. prior to pouring.

19. The device of claim 8 wherein said molten lead is maintained at a temperature in a range of 370° C. to 390° C. prior to pouring.

20. The device of claim 9 wherein said molten lead is maintained at a temperature in a range of 370° C. to 390° C. prior to pouring.

21. The device of claim 10 wherein said molten lead is maintained at a temperature in a range of 370° C. to 390° C. prior to pouring.

22. An apparatus for manufacturing a strap joining electrode plate leads, aligned in an electrode row, with a pillar electrode, the apparatus comprising:

a strap mold having a recess corresponding to an external shape of said strap and comb teeth at a bottom face of the recess for interposition between said electrode plate leads and which define gaps between said comb teeth and said electrode plate leads;

a melting furnace with a reservoir for containing molten lead and a pouring aperture from which the molten lead is poured;

means for pouring the molten lead said pouring aperture into the recess in the strap mold, said pouring aperture being configured such that the molten lead fans out when leaving the pouring aperture and prior to pooling in said recess to promote radiation of heat; and means for heating areas of the electrode plate leads and the pillar electrode after the molten lead turns to solidified lead to melt and join the solidified lead, the electrode plate leads, and a base of the pillar electrode.

23. The apparatus according to claim 22 wherein the pouring aperture is formed at an end of a spout communicated with a discharge aperture formed in a bottom portion of said reservoir and said spout extends downward external of said reservoir.

24. The apparatus according to claim 23 wherein said molten lead is maintained at a temperature in a range of 370° C. to 390° C. prior to pouring.

25. The apparatus according to claim 23 wherein said spout is a trough having a flat bottom face and a screening plate at a downstream end of said spout with a face disposed to arrest flowing momentum of the molten lead, said screening plate defining said pouring aperture between a bottom edge of said screening plate and an end of said flat bottom face such that a direction of elongation of said pouring aperture is in the direction of the electrode rows.

26. The apparatus according to claim 25 wherein said pouring aperture is formed having a width in a flow direction which increases towards both ends in the direction of elongation.

27. The apparatus according to claim 26 wherein said molten lead is maintained in said reservoir at a temperature in a range of 370° C. to 390° C. prior to pouring.

28. The apparatus according to claim 22 wherein said means for heating is a welding device that effects melting whilst blowing a mixed gas containing reducing gas.

29. The apparatus according to claim 22 wherein said molten lead is maintained at a temperature in a range of 370° C. to 390° C. prior to pouring.

30. The apparatus according to claim 22 wherein said means for heating includes means for moving a welding device at a speed such that a depth of melting of the solidified lead, the electrode plate leads, and the bases of the pillar electrodes does not reach the bottom face of the recess of the strap mold.

31. The apparatus according to claim 22 wherein the means for heating includes means for moving heat applied along a prescribed melting path that traces areas of the electrode plate leads and the bases of the pillar electrodes.

* * * * *